United States Patent [19]

Su et al.

[11] 4,125,594

[45] Nov. 14, 1978

[54] PURIFICATION OF HYDROFLUORIC ACID ETCHING SOLUTIONS WITH WEAK ANION EXCHANGE RESINS

[75] Inventors: Yao-Sin Su, Corning; Ken F. Sugawara, Painted Post, both of N.Y.

[73] Assignee: Corning Glass Works, Corning, N.Y.

[21] Appl. No.: 753,420

[22] Filed: Dec. 22, 1976

[51] Int. Cl.$^2$ .............................................. C01B 7/22
[52] U.S. Cl. ................................ 423/488; 210/37 R; 156/642
[58] Field of Search ....................... 423/488, 484, 483; 75/101 B, 101 E; 210/37 R; 156/642

[56] References Cited

U.S. PATENT DOCUMENTS 2,341,907  2/1944  Cheetham et al. ................ 210/37 R
2,504,695  4/1950  Jukkola et al. ................ 210/37 R X
4,056,605  11/1977  Vulikh et al. ........................ 423/484

OTHER PUBLICATIONS

Book "Ion Exchange Separations in Analytical Chemistry", by Olaf Samuelson, 1963, pp. 73, 74, 310, 312, J. Wiley & Sons, N.Y.

Primary Examiner—O. R. Vertiz
Assistant Examiner—Thomas W. Roy
Attorney, Agent, or Firm—Kees van der Sterre; Clinton S. Janes, Jr.; Clarence R. Patty, Jr.

[57] ABSTRACT

A method for purifying a spent hydrofluoric acid etching solution containing siliceous by-products which comprises treating the solution with a weak anion exchange resin of the polyamine type to remove $SiF_6^=$ ions therefrom is described. The anion exchange resin may be regenerated with aqueous NaOH.

2 Claims, No Drawings

PURIFICATION OF HYDROFLUORIC ACID ETCHING SOLUTIONS WITH WEAK ANION EXCHANGE RESINS

BACKGROUND OF THE INVENTION

The present invention relates to the treatment of spent hydrofluoric acid etching solutions used for etching silicate glasses. Such etching solutions are utilized in a number of glass finishing operations, including incandescent lamp bulb frosting, television faceplate polishing, and the chemical machining of glass.

Spent hydrofluoric acid solutions contain, in addition to substantial quantities of hydrofluoric acid, various by-products of glass dissolution. These include the dissolved metallic cations of lithium, aluminum, zinc, calcium and the like as well as complex anions containing silicon and aluminum. Among the most troublesome solution constituents from the standpoint of etching efficiency are siliceous compounds such as fluosilicic acid ($H_2SiF_6$) which change the etching rate of the solution depending upon the composition of the glass. Fluosilicic acid also appears to participate in the formation of fluoride sludges and other deposits which clog the plumbing used to circulate the solution in the etching process.

The depletion of hydrofluoric acid from the etching solution in use can be counteracted by periodic replacement. However, the useful life of the solution is still limited by the buildup of fluosilicic acid and other glass dissolution by-products therein. Solution life could be extended significantly if an economic means for removing fluosilicic acid from the solution could be developed.

Reference to the use of ion-exchange resins to perform analytical and other separations of metals contained in hydrofluoric acid solutions is found in the literature. For example, separation of the dissolved metallic elements vanadium, scandium and arsenic from titanium, germanium and gallium through the ion-exchange treatment of hydrofluoric acid solutions of these metals is reported by U. Schindewolf and J. W. Irvine, Jr. in Anal. Chem. 30, 906 (1958). In carrying out these separations, a strong anion exchange resin is used, and the elution of anionic fluoride complexes of certain of these metals is controlled by varying the hydrofluoric acid concentrations of column influents.

A survey of the adsorption characteristics of a large number of different anionic metal fluoride complexes on a strong anion exchange resin was conducted by J. P. Faris, as reported in Anal. Chem. 32, 520 (1960). A considerable range of hydrofluoric acid concentrations was utilized, but not all elements were included in the survey.

The use of a strong cation exchange resin to separate metal cations through a hydrofluoric acid elution process is described by J. S. Fritz, B. B. Garralda and S. K. Karraker in Anal. Chem. 33, 882 (1961). These authors attribute the rapid preferential elution of certain metals by weak hydrofluoric acid solutions to the formation of anionic fluoride complexes thereof in the elution process.

None of the foregoing authors actually dealt with the problem of removing complex silicofluoride anions from strong hydrofluoric acid solutions, or the suitability of ion exchange resins for achieving this result. It is a principal object of the present invention to provide an ion exchange process which can economically be used to purify spent hydrofluoric acid solutions by removing these ions therefrom.

SUMMARY OF THE INVENTION

In accordance with the invention, the complex silicofluoride anion of fluosilicic acid ($SiF_6^=$) is selectively removed from a spent etching solution by treatment of the solution with a weak anion exchange resin. It is found that the $SiF_6^=$ ion is strongly and rapidly adsorbed onto such a resin even in the presence of relatively high concentrations of hydrofluoric acid. Thus essentially complete separation from the remainder of the etching solution is possible provided the effective capacity of the resin is not exceeded.

Solutions of the kind treatable in accordance with the invention typically contain hydrofluoric acid in amounts ranging up to about 13% by weight. The amount of fluosilicic acid present may range from a trace up to a concentration of about 35 grams per liter, although solutions containing even higher concentrations could also be treated.

The removal of the silicofluoride anion from an etching solution permits it to be satisfactorily re-used for etching even though certain other by-products are still present therein. To the extent that fluosilicic acid is removed, the sludge-forming capacity of the solution is reduced. In addition, the buildup of deposits in the solution circulating system is retarded, so that fewer interruptions for servicing are required.

The invention also includes a method for regenerating a weak anion exchange resin containing adsorbed silicofluoride anions which comprises the step of eluting the silicofluoride anions from the resin with an aqueous solution of a strong alkali such as NaOH. Although the desorption of the silicofluoride anion from the resin is less rapid than its adsorption, the use of concentrated solutions of alkali is not required. Slow solution flow rates which permit the resin to come to equilibrium in the alkaline medium minimize the volume of solution which must be used for complete elution of the anion.

DETAILED DESCRIPTION

Weak anion exchange resins suitable for use in accordance with the invention include commercially available resins of the polyamine type. These are styrene-divinylbenzine copolymers, consisting predominantly of polystyrene, which comprise a large number of ionizable primary, secondary and/or tertiary amine groups functioning as ion exchange sites.

Weak anion exchange resins are typically supplied in salt form rather than in the so-called free base form, with the chloride salt form being most commonly available. It is desirable to convert the resin from the chloride to the fluoride salt form before using the resin as an etching solution treating medium, in order to enhance $SiF_6^=$ adsorption behavior and to avoid introducing extraneous chloride ions into the system. Conversion of the resin to the fluoride salt form may be accomplished by conditioning with hydrofluoric acid prior to use. Typically, passing about 2 column volumes of 13% (weight) hydrofluoric acid through the column is sufficient to achieve essentially complete conversion.

Commercially available weak anion exchange resins of the polyamine type have rated adsorption capacities of 1.9 milliequivalents or more of adsorbed ion per milliter of resin volume. However, the effective capacity of such resins in 13% (weight) hydrofluoric acid is normally somewhat less than this rated value, due to high pH conditions. In any event, the effective ion exchange capacity of a weak anion exchange resin under conditions approximating those of actual use may readily be determined using well known procedures, and the minimum amount of resin required for anion removal may then be determined.

The actual size of the resin bed to be used in any specific case will depend upon the amount of solution to be processed and rate at which it is to be treated. The adsorption of complex silicofluoride anions by a weak anion exchange resin is quite rapid; therefore, the speed at which the spent solution is processed is not highly critical. Treatment at a solution flow rate of 6 column volumes per hour has been found to be quite satisfactory for quantitative removal of silicofluoride anions in amounts ranging up to about the maximum effective exchange capacity of the resin employed.

It is found that the selection of a weak anion exchange resin, rather than one of the other commercially available resin types (strong anion, weak cation, or strong cation resins), is of considerable practical importance in attaining the objects of the present invention. Strong and weak cation exchange resins are of course not effective for removing complex fluoride anions from these solutions, and are therefore unsuitable for the present purpose. Strong anion exchange resins, on the other hand, exhibit satisfactory adsorption of silicofluoride anions, but cannot be conveniently regenerated by economically feasible methods. Only weak anion exchange resins are readily regenerated with aqueous alkali metal hydroxide solutions. Thus, these resins constitute the only economical means for removing fluosilicic acid from spent etching solutions by ion exchange methods, if practical requirements relating to resin regeneration and re-use are taken into account.

A specific procedure for purifying a spent hydrofluoric acid solution using a weak anion exchange resin is described in the following example.

EXAMPLE

A quantity of a weak anion exchange resin of the polyamine type is provided. The resin consists of styrenedivinylbenzine granules of about 20–50 mesh size, being commercially available in chloride form as AG ® 3 resin from Bio-Rad Laboratories, Inc., Berkeley, Calif.

A plastic ion exchange column having an inside diameter of 1 inch and a length of 15 inches is provided, and about 110 ml of the ion exchange resin is introduced into the column to form a cylindrical resin bed. This resin is then converted from the chloride to the fluoride form by conditioning with 200 ml of 13% (weight) hydrofluoric acid, which is passed through the column at a flow rate of about 15 ml per minute (about 9 column volumes per hour). The conditioned resin bed has a final volume of about 100 ml.

After the resin has been conditioned, 100 ml of spent hydrofluoric acid etching solution is passed through the column. This solution contains about 13% (weight) hydrofluoric acid and, in addition to other by-products of the etching process, about 35 grams per liter of fluosilicic acid. Analysis of the etch solution present in the resulting effluent from the column indicates that essentially all of the silicofluoride anions originally present in the spent etching solution (a total of about 50 milliequivalents of $SiF_6^=$) are retained by the resin.

The hydrofluoric acid solution treated by passage through the column may be reused as an etching medium for glass. The sludge-forming characteristics thereof are significantly reduced due to the removal of fluosilicic acid therefrom.

Regeneration of the column is accomplished by elution of the $SiF_6^=$ anions with aqueous NaOH. About 6 column volumes of 2.0 N NaOH solution is passed through the column at a slow flow rate (1–2 ml. per minute) to promote the attainment of resin-solution equilibrium during elution. Atomic absorption spectrometric tests for silica are run on the final column effluents, and it is determined that this quantity of solution is sufficient to essentially completely remove $SiF_6^=$ anions from the resin. Thereafter, the resin may again be used to purify fluosilicic acid-containing hydrofluoric acid etching solutions.

In contrast to the behavior of weak anion exchange resins such as illustrated in the Example, strong anion exchange resins require the use of hydrochloric acid or concentrated (30 wt.%) hydrofluoric acid solutions for regeneration following $SiF_6^=$ ion adsorption. Although dilute hydrochloric acid effectively elutes these ions, the concomitant introduction of chloride ions into the column decreases the adsorptive characteristic of the resin for $SiF_6^=$. Removal of the chloride ions is thus required before the resin can again be used.

The use of 30% hydrofluoric acid as a regenerant avoids introducing unwanted additional anions into the column. However, this technique is not economically feasible since the amount of acid which must be used to regenerate the column approaches or exceeds that amount which is saved by the purification process.

For the above reasons, we have concluded that weak anion exchange resins are the medium best suited for etching solution purification as hereinabove described. Hence, these resins are not only surprisingly effective for removing the silicofluoride complex from strong hydrofluoric acid solutions, but are also readily regenerated using inexpensive NaOH.

We claim:

1. A method for purifying a spent hydrofluoric acid glass etching solution containing up to about 13% HF by weight and containing fluosilicic acid by removing $SiF_6^=$ ions therefrom which comprises the steps of treating said spent solution with a weak anion exchange resin of the polyamine type in the fluoride salt form to remove said $SiF_6^=$ ions, thereafter regenerating the weak anion exchange resin with an aqueous solution of NaOH and then converting the regenerated weak anion exchange resin back to the fluoride salt from.

2. A method according to claim 1 wherein the spent hydrofluoric acid solution contains up to about 35 grams per liter of fluosilicic acid.

* * * * *